April 18, 1939.   R. BARTHELEMY   2,155,034
PHOTOELECTRIC CELL MODULATOR
Filed July 17, 1935
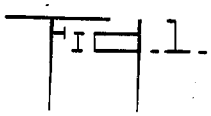
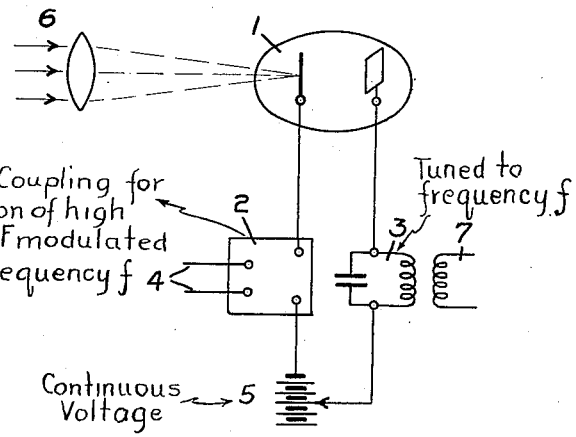
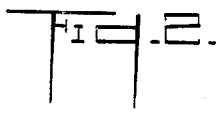
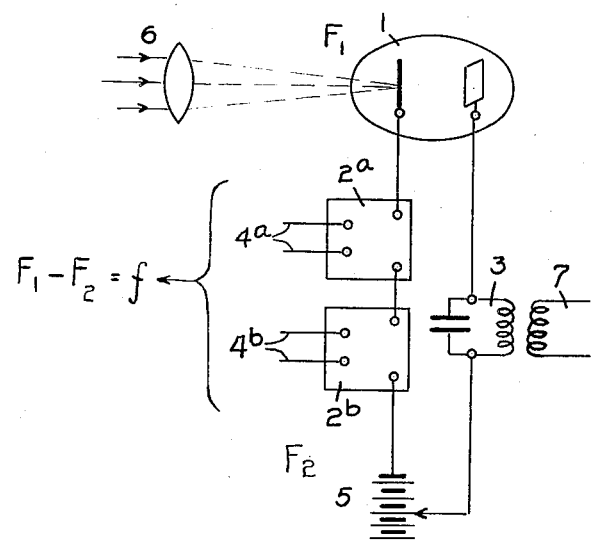
René Barthelemy
INVENTOR
BY
his ATTORNEY.

Patented Apr. 18, 1939

2,155,034

UNITED STATES PATENT OFFICE 2,155,034

PHOTOELECTRIC CELL MODULATOR

René Barthelemy, Fontenay aux Roses, France, assignor to Compagnie pour la Fabrication des Compteurs et Materiel d'Usines a Gaz, Mountrouge, France Application July 17, 1935, Serial No. 31,842
In France July 23, 1934

3 Claims. (Cl. 179—171)

In order to be able easily to amplify the current provided by photoelectric cells, it is necessary to give to this current a high frequency component. Various solutions have already been proposed of this problem. The most usual one consists in rapidly and regularly interrupting the light with the aid of a disc pierced with holes.

The present invention relates to a method of introducing a modulated high frequency current into the anode circuit of the photoelectric cell. This method is particularly applicable to cells having a feeble gas pressure and of small dimensions in which the anode is close to the cathode.

The method of the present invention consists essentially in introducing into the anode cathode circuit of the cell a high frequency current, one characteristic of which being modulated at a lower frequency $f$, and in inserting in this circuit a second circuit tuned to the said frequency $f$.

Two processes capable of being used for the introduction of this modulation at the frequency $f$ will be explained in the following description and with the aid of the attached drawing, in which Figs. 1 and 2 are diagrammatic views showing two elementary embodiments of the method claimed.

According to Figure 1, in the anode cathode circuit of a photoelectric cell 1 comprising at least an anode and a cathode, are inserted a device 2 and an oscillating circuit 3. The device 2 permits of the introduction into the anode cathode circuit of a high frequency component F modulated by a lower frequency $f$. The device 2 receives a high frequency current F modulated at the frequency $f$ by the connections 4. The frequency $f$ must be clearly greater than the most rapid limits of the luminous modulation.

The oscillating circuit 3 is tuned to the frequency $f$.

The anode cathode circuit can then comprise a continuous voltage 5 which allows the point of operation of the cell to be adjusted.

The current flowing through the anode-cathode circuit is modulated by the light thrown on cell 1 by a source of light 6.

In the absence of light no current flows in the anode cathode circuit and no oscillation is set up in the tuned circuit 3. If the cell receives light and if its point of operation is suitably chosen, a very efficient detection is produced and oscillations of frequency $f$ are set up in the circuit 3. The current of frequency $f$ which flows through the inductance inserted in the circuit 3 has an intensity substantially proportional to the luminous flux which falls on the cell and can be amplified by any known device. A coil 7 associated with the coil of the tuning circuit 3 connects the latter to the amplifying and transmitting devices.

A variation of this process, which is shown in Figure 2, consists in introducing into the anode cathode circuit of the cell two components of high frequencies $F^a$ and $F^b$ with the aid of devices $2^a$ and $2^b$. The frequencies $F^a$ and $F^b$ are different from one another by a quantity $f$. This interference frequency $f$ appears in the circuit 3 as soon as the cell receives light.

The frequencies $F$, $F^a$, $F^b$ are not amplified in the amplifiers disposed at the output of the circuit 3, and there is not introduced into the amplifiers either disturbances or parasitic whistles in the absence of light.

What I claim is:

1. The herein described method of producing variations at a given high frequency in a current modulated by a photoelectric cell, exposed to the light emanating from a source of light of variable intensity, which method consists in inducing into the circuit of said cell a modulated high frequency current having a modulation component of a given high frequency and at least one further component of a frequency higher than said given frequency, modulating the said modulated current by means of the light falling on the photoelectric cell, detecting the said modulation component by means of said photoelectric cell and producing by means of the detected current a further current of said given high frequency, the latter current being modulated according to the variations in the exposure of the cell.

2. The herein described method of producing variations at a given high frequency in a current modulated by a photoelectric cell exposed to the light emanating from a source of light of variable intensity, which method consists in inducing into the circuit of said cell a modulated high frequency current of a frequency higher than a given high frequency and being modulated by the latter frequency, modulating the said modulated current by means of the light falling on the photoelectric cell, detecting the modulating current having said given high frequency by means of the photoelectric cell and producing by means of the detected current a further current of said given high frequency, the latter current being modulated according to the variations in the exposure of the cell.

3. The herein described method of producing variations at a given high frequency in a current modulated by a photoelectric cell, exposed to the light emanating from a source of light of variable intensity, which method consists in inducing into the circuit of said cell a modulated high frequency current having two components of frequencies higher than a given high frequency and a modulation componet having a frequency equal to the difference between the frequencies of said first-named components and to the said given high frequency, modulating the said modulated current by means of the light falling on the photoelectric cell, detecting the said modulation component by means of said photoelectric cell and producing by means of the detected current a further current of said given high frequency, the latter current being modulated according to the variations in the exposure of the cell.

RENÉ BARTHELEMY